United States Patent [19]

McCartney

[11] Patent Number: 4,758,920
[45] Date of Patent: Jul. 19, 1988

[54] TELEPHONE AND DATA OVERVOLTAGE PROTECTION APPARATUS

[75] Inventor: Thomas McCartney, Bannockburn, Ill.

[73] Assignee: Oneac Corporation, Libertyville, Ill.

[21] Appl. No.: 20,701

[22] Filed: Mar. 2, 1987

[51] Int. Cl.[4] .............................................. H02H 9/04
[52] U.S. Cl. ...................................... 361/119; 361/91; 361/111; 379/412
[58] Field of Search ................... 361/56, 91, 111, 118, 361/119, 120, 126, 127, 54; 379/412, 331

[56] References Cited

U.S. PATENT DOCUMENTS

| | | | |
|---|---|---|---|
| 3,571,658 | 3/1971 | Knoth | 361/40 |
| 3,725,613 | 4/1973 | Allen et al. | 179/175.3 |
| 3,944,753 | 3/1976 | Proctor et al. | 179/84 VF |
| 3,950,676 | 4/1976 | Dornseifer et al. | 361/40 |
| 4,039,763 | 8/1977 | Angner et al. | 179/99 |
| 4,203,006 | 5/1980 | Mascia | 179/2 C |
| 4,254,442 | 3/1981 | Dijkmans et al. | 361/56 |
| 4,455,586 | 6/1984 | McCartney | 361/91 X |
| 4,536,618 | 8/1985 | Serrano | 179/84 R |
| 4,544,983 | 10/1985 | Anderson et al. | 361/119 |
| 4,586,104 | 4/1986 | Standler | 361/91 |
| 4,591,666 | 5/1986 | Boeckmann | 179/90 B |
| 4,628,398 | 12/1986 | Cook | 361/120 |

Primary Examiner—A. D. Pellinen
Assistant Examiner—Todd E. DeBoer
Attorney, Agent, or Firm—Mason, Kolehmainen, Rathburn & Wyss

[57] ABSTRACT

Overvoltage protection circuits are provided for coupling a subscriber's station to first and second conductors connected to a telephone system or other similar communications source. The overvoltage protection circuits include first circuitry connected between the first and second conductors for conducting current at a first breakdown voltage and for blocking current below the first breakdown voltage; second circuitry for conducting current at a second breakdown voltage and for blocking current below the second breakdown voltage; and circuitry connected in series between the first and second circuitry for filtering voltage signals on the first and second conductors responsive to the second circuitry conducting current. The overvoltage protection circuits are effective for suppressing noise and transient voltage signals occurring above the data signal and do not require a transient voltage signal to exceed the ring signal for operation.

11 Claims, 1 Drawing Sheet

4,758,920

TELEPHONE AND DATA OVERVOLTAGE PROTECTION APPARATUS

BACKGROUND OF THE INVENTION

1. Field of the Invention

This invention relates generally to an overvoltage protection circuit for a pair of telephone lines and similar data communication channels and, more particularly, to circuitry for filtering noise and transient voltage signals above data signals on the lines or channels.

2. Prior Art

Various arrangements have been used for protecting telephone and communications equipment against hazardous voltages due to lightning or power surges. However, conventional arrangements are effective for clamping transient voltages at a rated potential selected above the ring signal of conventional communications systems. The typical ring signal is about 170 volts AC peak with a frequency between 15 and 30 hertz so that the conventional arrangements typically have a rated clamping voltage of approximately 200 volts. Consequently, such arrangements are ineffective for filtering noise and transient voltage signals occurring below this standard clamping voltage.

SUMMARY OF THE INVENTION

It is an object of the present invention to provide an overvoltage protection arrangement that overcomes many of the disadvantages of the prior art systems.

It is another object of the present invention to provide an improved overvoltage protection apparatus for coupling a subscriber's station to a telephone system or other similar communications source.

It is another object of the present invention to provide such apparatus that is effective for protecting communications equipment against hazardous voltages due to lightening or power surges.

It is yet another object of the present invention to provide such apparatus further effective for suppressing or minimizing noise and transient voltage signals occurring below a predefined potential of a ring signal supplied by the telephone or other communications system.

Therefore, in accordance with the preferred embodiments of the invention, there are provided overvoltage protection arrangements for coupling a subscriber's station to first and second conductors connected to a telephone system or other similar communications source. The overvoltage protection arrangements include first means connected between the first and second conductors for conducting current at a first breakdown voltage and for blocking current below said first breakdown voltage; second means for conducting current at a second breakdown voltage and for blocking current below said second breakdown voltage; and means connected in series between said first and second means for filtering voltage signals on said first and second conductors responsive to said second means conducting current.

In accordance with an important feature of the invention, the overvoltage protection arrangements are effective for suppressing noise and transient voltage signals occurring above the data signal and do not require a transient voltage signal to exceed the ring signal for operation.

DESCRIPTION OF THE DRAWING

These and other objects and advantages of the present invention will become readily apparent upon consideration of the following detailed description and attached drawing wherein.

DETAILED DESCRIPTION OF THE PREFERRED EMBODIMENT

Figure 1:
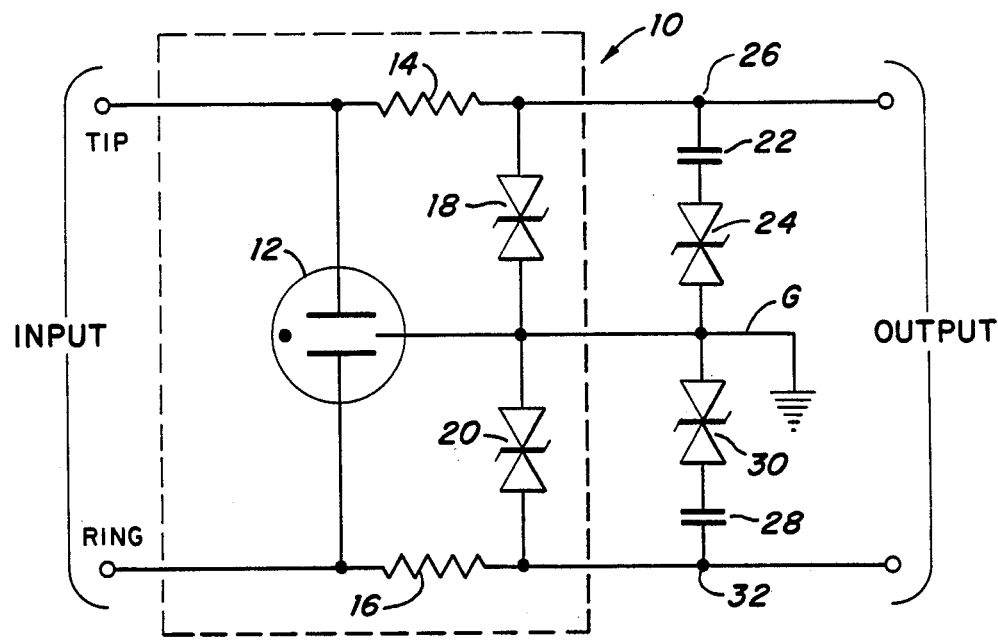
FIG. 1 is an electrical schematic representation of an overvoltage protection apparatus arranged in accordance with the principles of the present invention.

Referring now to the FIG. 1, there is illustrated an electrical schematic representation of an overvoltage protection circuit according to the invention generally designated by the reference numeral 10. The overvoltage protection circuit 10 is adapted for connection via TIP and RING conductors to a telephone system or other similar communications source at its INPUT. A subscriber's station, such as a key set, modem or private branch exchange is connected to the OUTPUT of the circuit 10. The overvoltage protection circuit 10 includes a gas discharge tube 12 or similar device that is connected between the TIP and RING conductors and to ground potential at ground line G. A resistor 14 is connected in series with the TIP line and a resistor 16 is connected in series with the RING line.

A transient voltage suppressor 18 is connected between the resistor 14 and ground potential and similarly a transient voltage suppressor 20 is connected between the resistor 16 and ground potential. The gas discharge tube 12 clamps transient voltages that appear both across the TIP and the RING conductors with respect to the ground line G and provides a high impedance to the ground line G when a high voltage transient is not present. A three electrode gas discharge tube device such as, a Milli-Triac part number MLT0090, rated for a breakdown voltage of 600 volts, manufactured by Reynolds Industries may be employed for the gas discharge tube 12. The transient voltage suppressors 18 and 20 conduct whenever the voltage potential applied to the TIP or RING lines, respectively, exceeds a predetermined breakdown voltage potential, for example, at 200 volts. The gas discharge tube 12, resistors 14 and 16 and the transient voltage suppressors 18 and 20 are enclosed in dotted lines in the accompanying figure and are effective for protecting the communications equipment from hazardous voltages due to lightning and power surges. Transient voltage suppressors of a type manufactured and sold by General Semiconductor Industries, Inc., a Square D Company under a registered trademark TransZorb, such as part number SCM170C rated for a reverse standoff voltage without conduction at 170 volts and for a breakdown voltage in a range between 189–231 volts, advantageously may be employed for suppressors 18 and 20.

A capacitor 22 and a transient voltage suppressor 24 are connected in series between the ground line G and a junction 26 of the series connected resistor 14 and transient voltage suppressor 18. Similarly, a capacitor 28 and a transient voltage suppressor 30 are connected between the ground line G and a junction 32 of the series connected resistor 16 and transient voltage suppressor 20. Similar devices as used for the transient voltage suppressors 18 and 20 advantageously can be employed for the suppressors 24 and 30, except having a lower breakdown voltage rating, such as part number SCM5.0C with a breakdown voltage rating in a range between 6.4-7 volts or part number SCM10C with a breakdown voltage rating in a range between 11.1-13.6 volts. The transient voltage suppressors 24 and 30 are selected to have a breakdown voltage rating above a predefined potential of a data signal carried by the TIP and RING conductors, such as, for example, 5 volts or 10 volts.

In operation, the series connected resistor 14, capacitor 22 and transient voltage suppressor 24 suppress noise and transient voltage signals having a predefined threshold rate of change and that are above the breakdown potential of the suppressor 24. This predefined threshold rate of change or frequency response is determined by the component values of the resistor 14 and capacitor 22. For example, capacitors 22 and 28 may be provided in a range of 0.1 and 1 microfarad with resistors 14 and 16 selected in a range between 10 and 30 ohms. Otherwise, in normal operation data signals are unaffected by the frequency response of the filter comprised of resistor 14 and capacitor 22 with the suppressor 24 blocking current flow. Similarly, the resistor 16, capacitor 28 and transient voltage suppressor 30 clamp noise and transient voltage signals occurring on the RING line.

Figure 2:
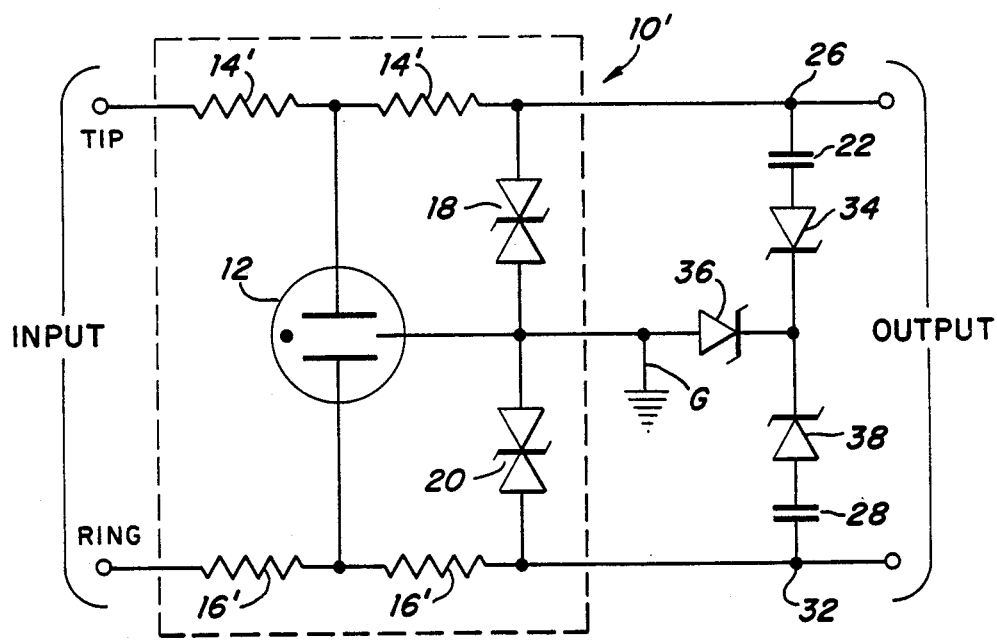
FIG. 2 is an electrical schematic representation of an alternative overvoltage protection apparatus arranged in accordance with the principles of the present invention.

Referring now to FIG. 2, there is shown an alternative embodiment of an overvoltage protection circuit according to the invention generally designated by the reference numberal 10'. The same reference numerals are used for similar components of FIG. 1. The protection circuit 10' includes a star arrangement of unipolar transient voltage suppressors 34, 36 and 38. The transient voltage suppressors 34, 36 and 38 perform the same function as the bidirectional suppressors 24 and 30 as before described. Unipolar transient voltage suppressors are available from General Semiconductor Industries, Inc. also sold under the registered trademark TransZorb as device types SCM5.0A through SCM170A.

In both protection circuits 10 and 10', the gas discharge tube 12 can be omitted. In addition, both protection circuits can be provided without the bidirectional transient voltage suppressors 18 and 20. It should be understood that the gas discharge tube 12 and the suppressors 18 and 20 can be eliminated and the protection circuits 10 and 10' remain effective for suppressing noise and transient voltage signals above the data signal.

Although the present invention has been described in connection with details of the preferred embodiment, many alterations and modifications may be made without departing from the invention. Accordingly, it is intended that all such alterations and modifications be considered as within and spirit and scope of the invention as defined in the appended claims.

What is claimed and desired to be secured by Letters Patent is:

1. An overvoltage protection circuit used with a pair of telephone lines comprising:

first voltage clamping means for clamping voltage signals on said lines at a first predetermined voltage potential;

second voltage clamping means for clamping voltage signals on said lines at a second predetermined voltage potential; and filter means responsive to said second voltage clamping means for filtering noise or transients signals from said voltage signals only when said voltage signals exceed said second predetermined voltage potential.

2. An overvoltage protection circuit as recited in claim 1 wherein said first voltage clamping means include a gas discharge tube.

3. An overvoltage protection circuit as recited in claim 2 further including a pair of bidirectional semiconductor transient voltage suppressor devices coupled across said gas discharge tube.

4. An overvoltage protection circuit as recited in claim 1 wherein said first voltage clamping means clamps at a predetermined voltage potential above a predefined potential of a ring signal carried by said lines.

5. An overvoltage protection circuit as recited in claim 1 wherein said second voltage clamping means clamps at a predetermined voltage potential above voice and data signals carried by said lines.

6. An overvoltage protection circuit as recited in claim 1 wherein said second voltage clamping means include a pair of bidirectional semiconductor transient voltage suppressor devices.

7. An overvoltage protection circuit as recited in claim 1 wherein said second voltage clamping means includes a star arrangement of three unipolar semiconductor transient voltage suppressor devices.

8. An overvoltage protection circuit as recited in claim 1 wherein said filter means are effective to filter said voltage signals above a predetermined frequency.

9. An overvoltage protection circuit as recited in claim 8 wherein said predetermined frequency is above a predefined ring signal frequency range.

10. An overvoltage protection circuit as recited in claim 1 wherein said filter means includes a resistor and capacitor connected in series between said first and second voltage clamping means.

11. An overvoltage protection apparatus used with first and second conductors connected to a telephone system or other similar communications source for protecting a subscriber station, said overvoltage protection apparatus comprising:

first means connected between the first and second conductors for conducting current while at a voltage greater than or equal to a first breakdown voltage and for blocking current while at a voltage below said first breakdown voltage;

second means coupled between the first and second conductors for conducting current while at a voltage greater than or equal to a second breakdown voltage and for blocking current while at a voltage below said second breakdown voltage; and means connected in series between said first and second means for filtering noise or transient signals from said first and second conductors only while said second means is at a voltage greater than or equal to said second breakdown voltage.

* * * * *